Oct. 6, 1959 T. M. COLE 2,907,840
FRONT OPERATED ENCLOSED SWITCHING APPARATUS
Filed Oct. 14, 1957 6 Sheets-Sheet 1
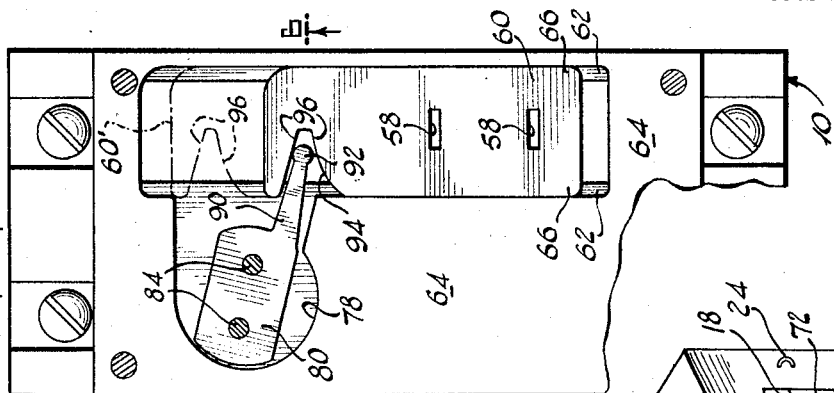
INVENTOR
THOMAS M. COLE
BY
Paul S. Martin
ATTORNEY Oct. 6, 1959 T. M. COLE 2,907,840
FRONT OPERATED ENCLOSED SWITCHING APPARATUS
Filed Oct. 14, 1957 6 Sheets-Sheet 2

INVENTOR
THOMAS M. COLE
BY Paul S. Martin
ATTORNEY

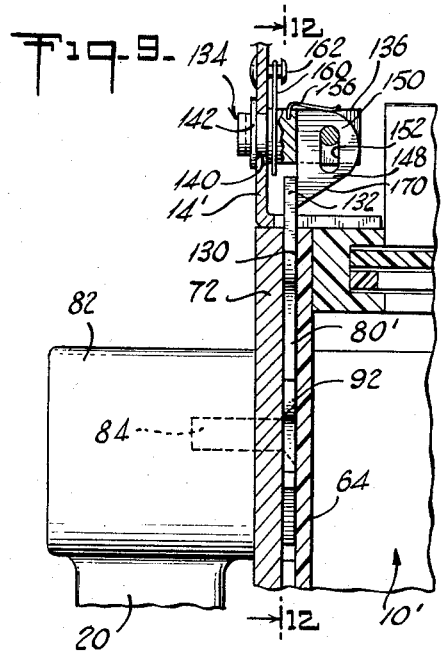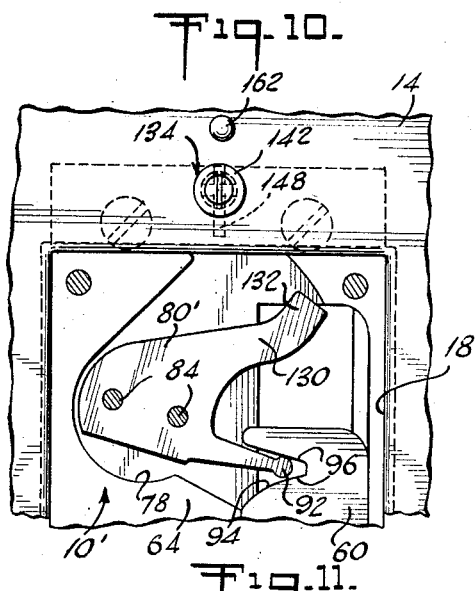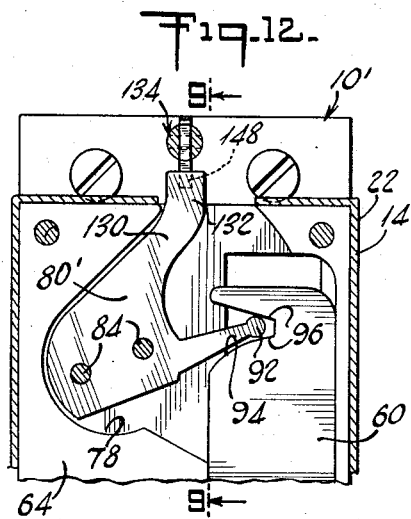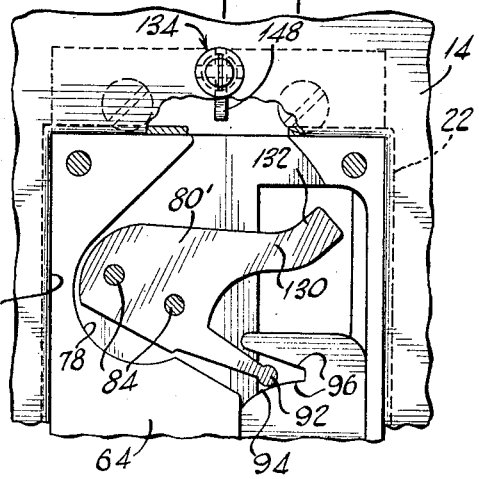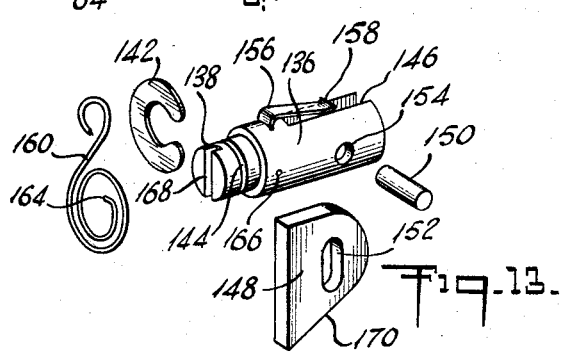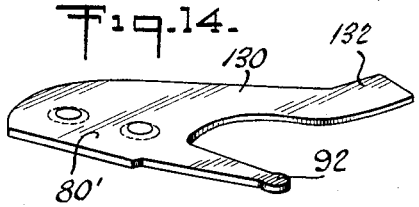

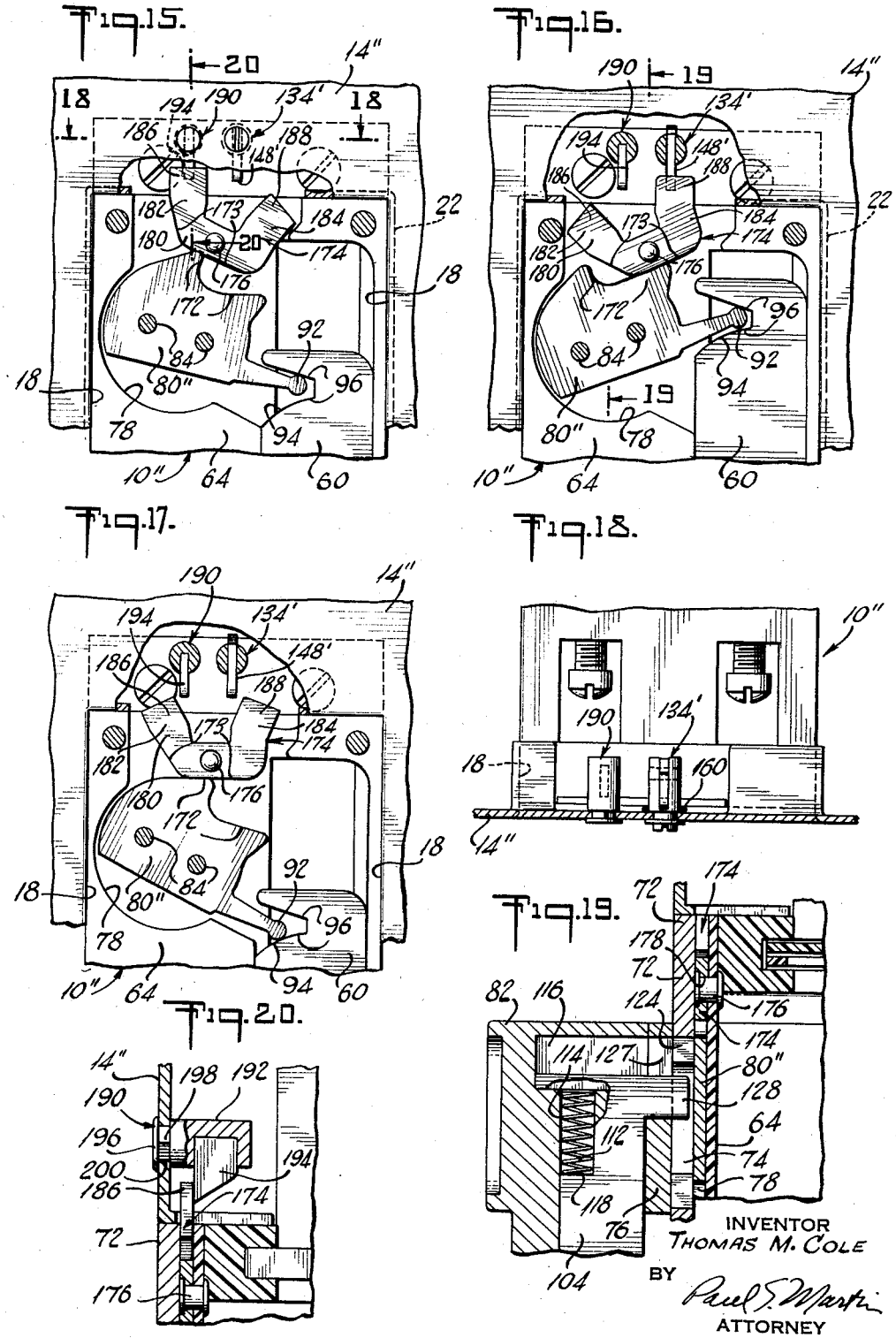

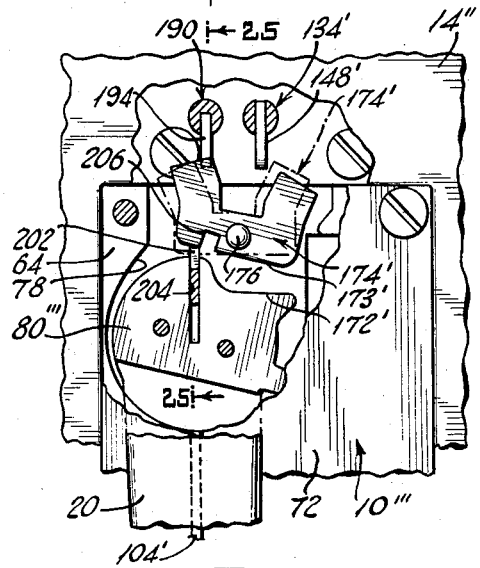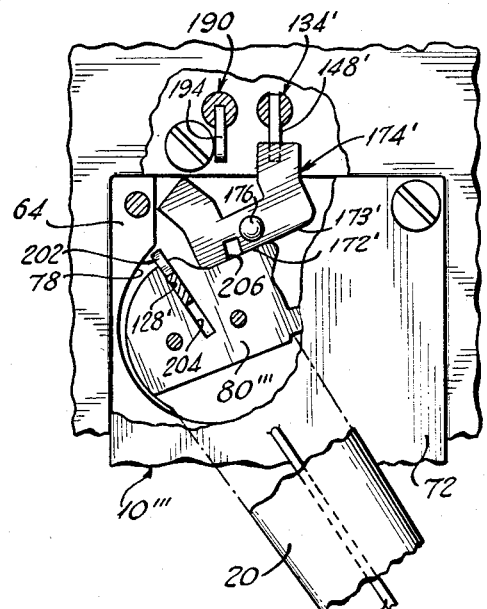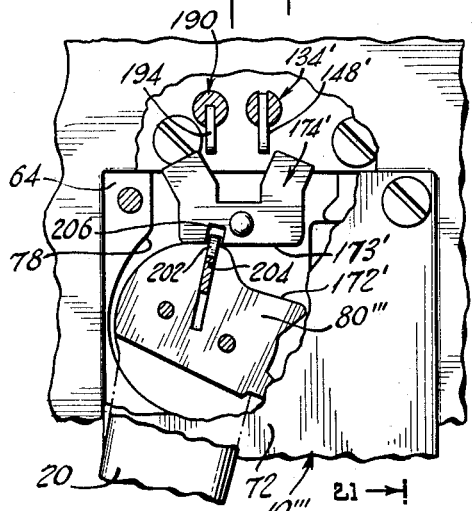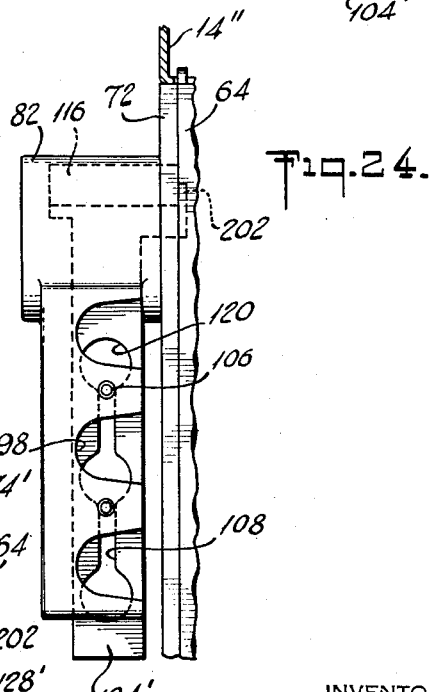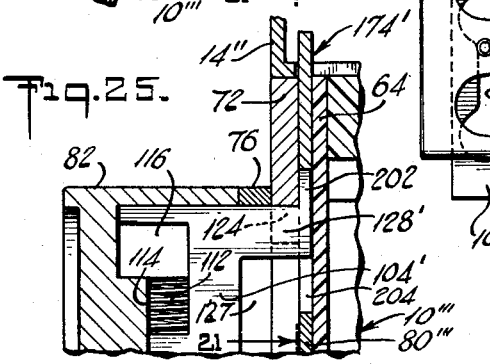

Oct. 6, 1959 T. M. COLE 2,907,840
FRONT OPERATED ENCLOSED SWITCHING APPARATUS
Filed Oct. 14, 1957 6 Sheets-Sheet 6

INVENTOR
THOMAS M. COLE
BY
ATTORNEY

United States Patent Office 2,907,840
Patented Oct. 6, 1959

2,907,840

FRONT OPERATED ENCLOSED SWITCHING APPARATUS

Thomas M. Cole, Harrison, N.Y., assignor to Federal Pacific Electric Company, a corporation of Delaware Application October 14, 1957, Serial No. 689,892

30 Claims. (Cl. 200—50)

This invention relates generally to front operated circuit breakers or switches and, more particularly, to enclosed front operated circuit breakers or switches having a twist handle projecting through an opening in a front openable cover for accessibility for manual actuation.

One object of the present invention is the provision of an enclosed front operated circuit breaker or switch having a twist handle which projects through an opening in a front openable cover in which there is provided novel mechanism for selectively latching or locking the cover closed in one or more predetermined positions of such handle corresponding to the opened and closed condition of the circuit breaker. Pursuant to this object of the present invention, the front cover may be releasably latched closed or externally locked on the locking of the handle in either the opened or closed condition of the circuit breaker, there being additional provision for locking the handle in a selected position in which such front cover is unlatched.

Another object of the present invention is the provision of an enclosed front operated circuit breaker of the aforenoted character in which the twist or rotatable actuating handle may be locked in one or more predetermined positions, the locking of the handle in such positions being effective to lock the cover closed in the operative condition of the cover latching mechanism.

Another object of the present invention is the provision of an enclosed front operated circuit breaker of the aforenoted character in which the cover latching mechanism and actuating handle are operatively interconnected so that the cover is latched closed in the "on" position of such handle and locked concomitantly with the locking of the handle, the handle in its unlocked position being movable from the "on" position to release the cover latch so that the cover may be opened.

Yet another object of the present invention is the provision of generally improved latching and locking mechanism for a front operated circuit breaker of the aforenoted character.

The above and other objects, features and advantages of the present invention will be more fully understood from the following description considered in connection with the accompanying drawings.

In the drawings which illustrate the best modes now contemplated by me for carrying out my invention:

Fig. 1 is a front perspective view of an enclosed circuit breaker formed in accordance with the present invention;

Fig. 2 is a vertical sectional view of the enclosed circuit breaker with the actuating handle shown in an unlocked condition and the circuit breaker open;

Fig. 3 is a front view of the circuit breaker with the handle shown in the "off" position in solid lines and in the "on" and "reset" positions in broken lines;

Fig. 4 is a sectional view taken on the line 4—4 of Fig. 2;

Fig. 9 is a side elevational view, partly in section, showing an actuating handle and companion cover latch mechanism of another embodiment of the present invention, said view being taken on the line 9—9 of Fig. 12 with the handle in the "on" position;

Fig. 10 is a view similar to Fig. 4 corresponding to the embodiment of Fig. 9, the handle being in the "off" position;

Figs. 11 and 12 are views similar to Fig. 10 with the handle shown in the "reset" and "on" positions, respectively;

Fig. 13 is a perspective view of the cover latch shown in disassembled relation;

Figure 26:
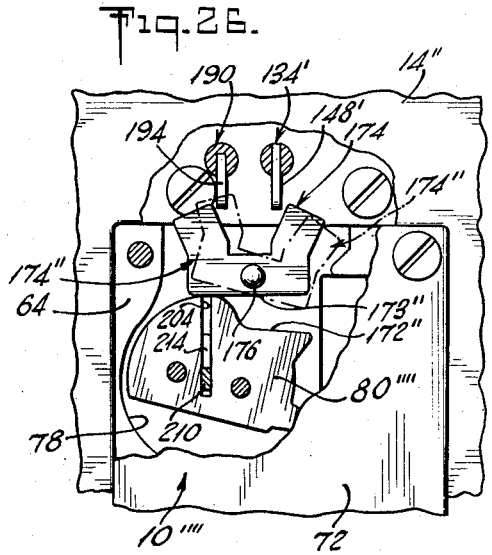
Figure 27:
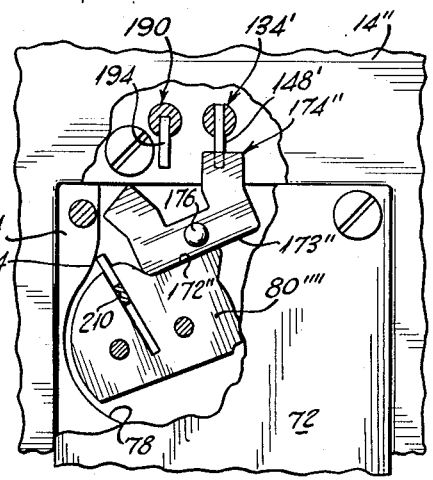
Figure 28:
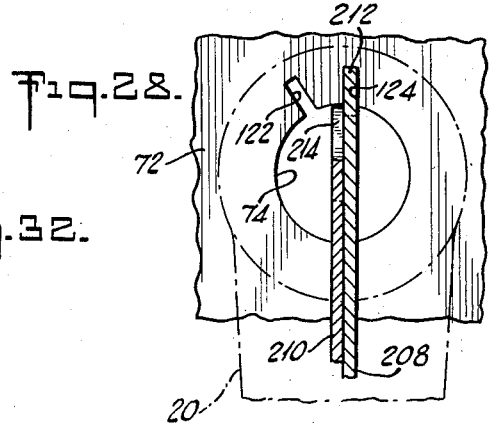
Figure 29:
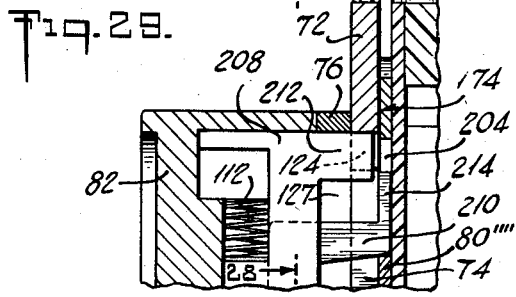
Figures 30, 31:
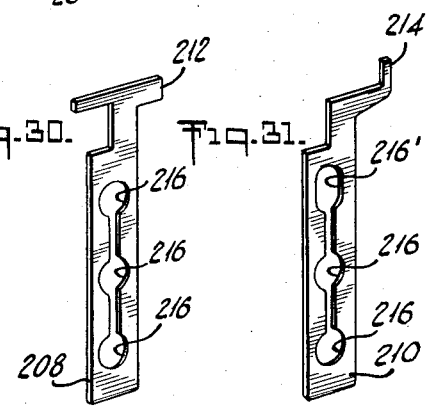

Fig. 14. is a perspective view of the handle operating plate;

Figs. 15, 16 and 17 are views similar to Figs. 10–12 showing another embodiment of the present invention with the handle in the "off", "on" and "reset" positions, respectively;

Fig. 18 is a sectional view taken on the line 18—18 of Fig. 15;

Fig. 19 is a sectional view taken on the line 19—19 of Fig. 16;

Fig. 20 is a sectional view taken on the line 20—20 of Fig. 15;

Figs. 21, 22 and 23 are views corresponding to Figs. 15–17 showing another embodiment of the present invention, Fig. 21 being taken on the line 21—21 of Fig. 25;

Fig. 24 is a side elevational view of the handle assembly of the embodiment of Figs. 21-23 with the handle assembly shown in an unlocked condition;

Fig. 25 is a sectional view taken on the line 25—25 of Fig. 21;

Figs. 26 and 27 are views corresponding to Figs. 21 and 22 showing yet another embodiment of the present invention;

Fig. 28 is a sectional view taken on the line 28—28 of Fig. 29 and showing the handle locked in the "off" position with the cover unlatched;

Fig. 29 is a sectional view of the handle assembly of the embodiment of Figs. 26 and 27 corresponding to the condition illustrated in Fig. 28;

Fig. 30 is a perspective view of the handle locking plate;

Fig. 31 is a perspective view of the handle latch plate; and

Figure 32:
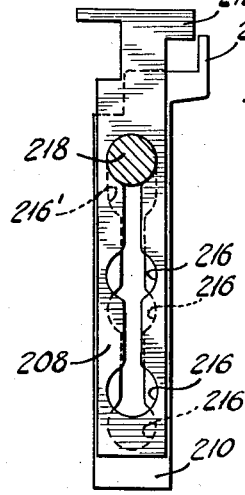

Fig. 32 is a view showing both handle plates operatively associated for achieving the condition illustrated in Figs. 28 and 29.

Referring to the drawings and, more particularly, to Figs. 1 through 8 thereof, there is shown a front operated circuit breaker 10 of a similar type as disclosed in Patent No. 2,673,264 issued on March 23, 1954 in the name of T. M. Cole and assigned to the assignee herein. The circuit breaker 10, which may be a single pole or multiple type, is suitably mounted in an enclosure or receptacle 12 having a front cover 14 which is hinged to said receptacle at one side thereof by hinges 16 so that the cover may be swung to open and closed positions. The cover is provided with an opening 18 through which the actuating handle 20 projects for manual actuation and said opening is defined by the peripheral flange 22 of the cover or door which seats against the circuit breaker casing to exclude foreign matter from the enclosure. The cover seats against the breaker casing with a frictional fit so that the cover stays closed in the unlatched condition thereof. The cover 14 is provided with a suitable handle 24 to facilitate the opening and closing thereof. The circuit breaker handle 20 is of the front operated twist type being pivotally movable about an axis substantially perpendicular to the cover to "on", "off" and "reset" positions as shown in Fig. 3 to correspondingly actuate the breaker. The handle 20 in all of its positions clears the cover 14 so that the latter may be swung open, when unlatched, irrespective of handle position.

The circuit breaker 10, which is disclosed in greater detail in the above referred to patent, comprises a casing 26 of molded insulating material which houses and supports the elements of the breaker mechanism. The breaker includes terminals 28 and 30 which are adapted for connection into an electrical circuit to be controlled. The breaker 10 is also provided with an associated pair of stationary and movable contacts 32 and 34, respectively, and an arc extinguisher 36. The movable contact 34 is mounted on a movable contact member 38 which in turn is mounted for actuation by the bar 40 which extends across the breaker and is journalled for rotation in the walls of the casing. The contact member 38 is movable to "open" and "closed" positions by the operating mechanism indicated generally at 42, there being provided a trip device indicated generally at 44 for effecting the automatic opening of the movable contact in response to predetermined overload conditions. Operatively associated with the mechanism 42 is a cradle 46 which in turn is associated with the trip device 44 in the well-known manner. The trip device 44 includes a trip bar 48 which is suitably mounted for rotation about its longitudinal axis. On overload conditions in the circuit breaker the trip bar 48 will be rotated to release the cradle 46 whereby mechanism 42 will open the companion contacts 32 and 34. The mechanism 42 is of the quick make and break type and includes a forked operating lever 50, a toggle 52, overcentering springs 54, and the releasable cradle. The lever 50 is pivotally movable to actuate the movable contact member 38 and is provided with a pair of upstanding flanges 56 which interfit in companion slots 58 (Figs. 2 and 4) of the actuating plate 60 which is formed of insulating material.

Pursuant to the present invention, the plate 60 is slidably mounted in a plane parallel to the cover for correspondingly actuating the lever 50 of the breaker. The plate 60 is guided for slidable movement in such plane by the rails 62 of the inner plate 64, the plate 60 having marginal edge portions 66 of reduced thickness which slide on said rails and interfit therewith. The front faces 68 and 70 of plates 60 and 64, respectively, are in flush relation as best shown in Fig. 2 and superposed on said front faces is a front cover plate 72 which forms the front cover of the breaker, said plate 72 filling the opening in the cover and being substantially flush therewith in the closed position of the cover.

The plate 72 is provided with an aperture 74 for the mounting of handle 20, there being a spacer 76 seated in said aperture. The inner plate 64 is cutaway as indicated at 78 to receive with operating clearance the handle actuating plate 80 (Figs. 4 and 6) which serves to transmit motion from the handle 20 to plate 60. The plate 60 is connected to the hub 82 of the handle by screws 84, the latter extending through apertures 86 in the spacer 76 and into companion threaded apertures 88 of the hub. Thus the spacer 76 serves as a bearing for the rotation of the handle of the breaker. It will be apparent that with this mounting of the twist handle on plate 72 gas escape openings are eliminated at said plate and, more particularly, from between the handle and said plate. It will be noted that the front face of the plate 80 is substantially flush with the front face 70 of plate 64 whereby the front faces of plates 60, 64 and 80 lie in a common plane having the plate 72 superposed thereon. The plate 80 is provided with a projecting lever 90 having a rounded terminal end 92, said lever projecting into the generally V-shaped slot 94 at the upper end of plate 60. The end 92 coacts with the cam edges 96 defined by slot 94 for sliding the plate 60 along the rails 62 to a position corresponding to the position of the breaker handle. In Fig. 4 the plate 60 is shown in the "off" position, said plate being movable by the handle to the broken line position 60' shown in said figure which corresponds to the "on" position, and to a "reset" position which is slightly below the solid line position of the plate 60. From the above it will be apparent that the rotation of the handle 20 will be effective to slide plate 60, through the cooperative association of plate 80 and slot 94, which in turn is effective to actuate lever 50 of the breaker to a corresponding position. It is to be noted that the breaker is trip-free so that it is operative automatically in response to predetermined abnormal circuit conditions irrespective of the position of the actuating handle. The operating mechanism of the breaker is of the quick make and break type in which the springs 54 actuate the toggle mechanism to make and break the circuit with a positive snap action.

Figure 5:
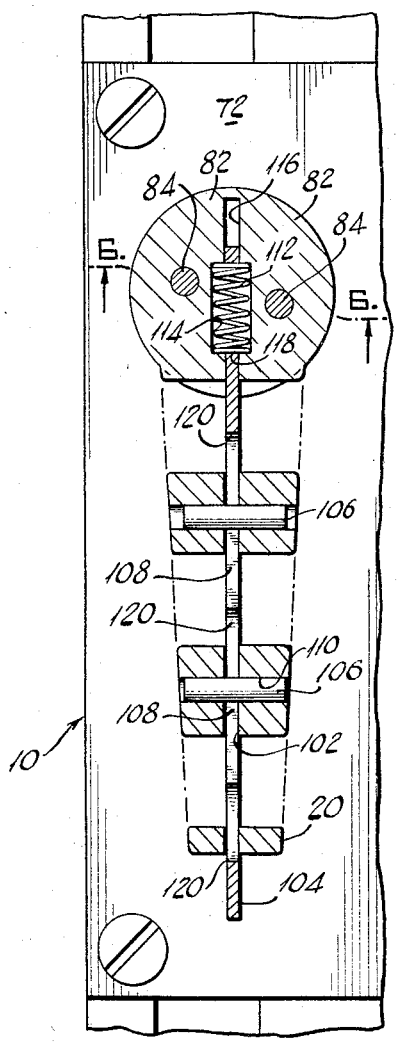
Fig. 5 is a sectional view, on an enlarged scale, taken on the line 5—5 of Fig. 2.
Figure 6:
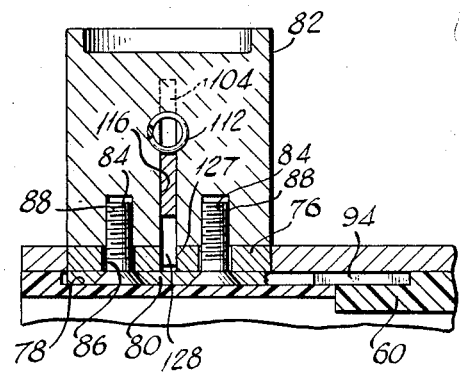
Fig. 6 is a sectional view taken on the line 6—6 of Fig. 5.
Figure 7:
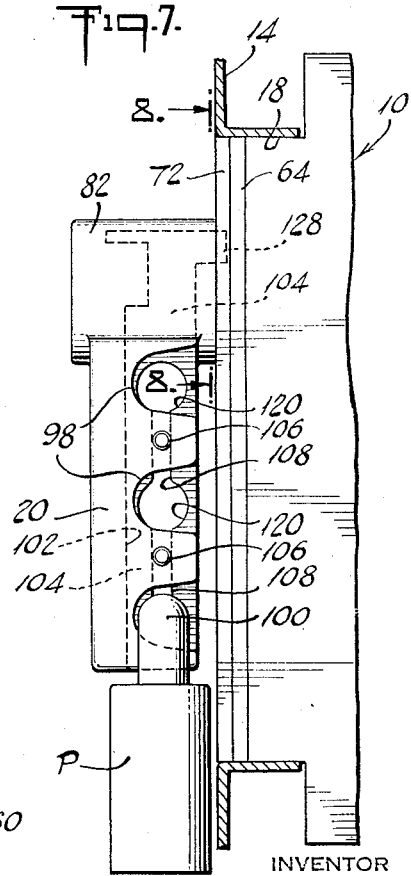
Fig. 7 is a side elevational view showing the actuating handle in a locked condition.
Figure 8:
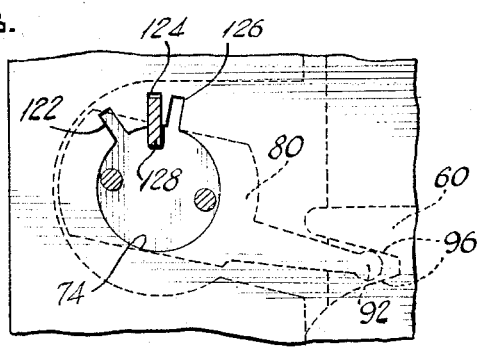
Fig. 8 is a sectional view taken on the line 8—8 of Fig. 7.

The operating handle 20 may be externally locked in any of the "on," "off" and "reset" positions thereof in the manner which will be described in detail below. The handle 20 is hollowed out and open at the rear (Figs. 5-7) and is provided with a series of three apertures 98 that are of such size as to receive the shank 100 of a padlock P. The handle 20 is slotted as indicated at 102 for the reception of the flat locking slide 104 which is longitudinally slidable in said slot between the unlocked position shown in Fig. 5 and the locked position shown in Fig. 7. Retaining pins 106 extend through elongated slots 108 of slide 104 and into companion apertures 110 of the handle to hold the handle and slide in assembled relation. To bias the slide downwardly and into an unlocked position there is provided a compression spring 112 seated in the aperture 114 of the hub 82 and extending across the slot 116 of the slide. Thus the bottom of the spring coacts with the edge 118 defined by slot 116 to bias the slide to the unlocked position. The slide has a set of three apertures 120 that are brought into registry with the apertures 98 of the handle upon movement of the slide into its upper or locked position against the action of spring 112 as shown in Fig. 7. In this locked position of the slide up to three padlocks P may be extended through the registered apertures 98 and 120.

Communicating with the aperture 74 of plate 72 is a series of three spaced slots 122, 124, and 126 (Fig. 8) corresponding to the "on," "off," and "reset" positions, respectively, of the handle, said slots being adapted to receive the locking projection 128 of the slide when the latter is raised to handle-locking position. The spacer 76 is provided with a slot 127 for the locking projection 128. Thus when the slide is raised to lock the handle the locking projection 128 will be extended into slot 122 when the handle is in the "on" position, with the locking projection extending into the slot 124 when the handle is in the "off" position, and into the slot 126 in the "reset" position of the handle. It will be understood that with the handle so locked the cover may be opened except when latched, as will be described in detail hereinafter. When the handle is locked by the slide the breaker mechanism will be locked in a corresponding position except under abnormal circuit conditions in which the trip-free feature comes into play.

With reference to Figs. 9-14, there is shown an enclosed circuit breaker 10', which corresponds to the previous embodiment 10 except provision is made to latch or lock the cover closed in the "on" position of the handle. The breaker 10' is similar to the breaker 10 except in the respects which will be pointed out in detail below. The handle actuating plate 80′ (Fig. 14) is provided with a latching member 130 having a latch part 132 which is adapted to interengage with the latch device 134 (Fig. 9 and 13) when the handle is in the "on" position as shown in Fig. 12. The cover latch device 134 is ineffective in the "off" and "reset" positions of the handle as shown in Figs. 10 and 11.

The cover latch device 134 comprises a cylindrical stud 136 having an end portion 138 of reduced diameter which interfits in the aperture 140 of the cover 14′, the stud being retained in position on the cover by the C washer 142 which interfits in the groove 144 of portion 138 with a snap fit. The stud 136 is longitudinally slotted as indicated at 146 for the reception of the latch part 148 with a free fit, said latch part being mounted in said slot for slidable movement transversely of the stud by the pin 150 which extends through the elongated slot 152 of the latch part and is secured in the aperture 154 of the stud. Thus the latch part 148 is slidable relative to the stud an amount corresponding to the length of slot 152. The latch part 148 is biased in a down position viewing Fig. 9 by the leaf spring 156 which is anchored at one end in the stud with the opposite free end 158 being in engagement with the latch part 148. The stud 136 is rotatably mounted on the cover for movement from a latching position as shown in Fig. 9 to an unlatching position in which the latch part 148 clears the companion latch part 132, the stud being biased to such latching position by the spring 160 which has one end anchored to the cover by the rivet 162 with the opposite end 164 being secured in the aperture 166 of the stud. The end of portion 138 is external of the cover and is slotted as indicated at 168 for the reception of a screwdriver whereby the latch device may be defeated by rotating the stud by a screwdriver against the bias of spring 160 to unlatch latch part 148 from latch part 132. The stud may be rotated in either direction to defeat the latch device and with the latch device defeated the cover is free to be swung open. When the handle is in the "on" position, the closing movement of the cover will cause the cam edge 170 of latch part 148 to engage latch part 132 to slide latch part 148 up against the bias of spring 156 to clear latch part 132 and snap interengage therewith when the cover is fully closed.

From the above it will be apparent that the handle may be externally locked in the "on," "off" and "reset" positions in the same maner as aforedescribed with reference to embodiment 10 and when the handle is externally locked in the "on" position, the cover is defeatably locked closed, the cover being defeatably latched closed in the unlocked "on" position of the handle. Thus the cover may be opened for breaker inspection or for any other reason in the "on" position of the actuating handle, whether the latter is unlocked or externally locked, by defeating the latch device.

With reference to Figs. 15–20, there is shown an enclosed circuit breaker 10″ which corresponds to the previous embodiment 10′ except provision is made to latch or lock the cover closed in both the "on" and "off" positions of the handle. The breaker 10″ is similar to the breaker 10′ except in the respects which will be pointed out in detail below. The handle actuating plate 80″ is provided with a compound cam edge 172 which cooperates with the pivoted latch plate 174 to move the latter into and out of its cover latching positions. The latch plate 174 is generally U-shaped and is pivotally mounted on the plate 64 of the breaker by the pivot pin 176 which extends through a companion aperture 178 in the base 180 of the latch plate. Thus the movement of the handle 20 is effective to concomitantly actuate the plates 60 and 174 to corresponding positions. The latch plate 174 is disposed in coplanar cooperative relation with actuating plate 80″ between the plates 64 and 72. The latch plate 174 is provided with laterally spaced arms 182 and 184 which terminate in latch parts 186 and 188, respectively. The cover 14″ is provided with a defeatable latch device 134′ which corresponds in all respects to the latch device 134 previously described and a stationary non-defeatable latch device 190. The latch device 190 comprises a stud 192 (Fig. 20) which carries a latch part 194, the stud being secured in position by the riveted over head 196. The stud has a quadrilateral shank 198 which interfits in a complementary aperture 200 in the cover to insure against the rotation of the stud on the cover.

In the "off" position of the handle as shown in Figs. 15 and 20 the latch parts 186 and 194 interengage to non-defeatably latch the cover closed and on the external locking of the handle the cover will be non-defeatably locked. In the "on" position of the handle as shown in Figs. 16 and 19 the latch parts 148′ and 188 interengage to defeatably latch the cover closed and on the external locking of the handle the cover will be defeatably locked. In the "reset" position of the handle the latch parts 186 and 188 of the latch plate 174 clear both the defeatable and non-defeatable cover latch devices so that the cover will not latch and cannot be externally locked in this position of the handle which corresponds to an open cover position. It will be understood that the coacting cam edges 172 and 173 of the plates 80″ and 174, respectively, are shaped and constructed to achieve the aforedescribed movement of the plate 174 to effect the aforedescribed cover-latching action. The handle is externally locked in the manner previously described and may be so locked in "on," "off" and "reset" positions, the locking of the handle in "on" and "off" positions being effective to respectively defeatably and non-defeatably lock the cover closed.

With reference to Figs. 21–25, there is shown an enclosed circuit breaker 10‴ which corresponds to the previous embodiment 10″ except provision is made so that in the "off" position of the handle the cover is unlatched when the handle is unlocked and the cover is locked on the external locking of the handle. The breaker 10‴ is similar to the breaker 10″ except in the respects to be pointed out in detail below. The handle actuating plate 80‴ is provided with a compound cam edge 172′ which coacts with the cam edge 173′ of the pivoted latch plate 174′ to move the latter to its various latching and non-latching positions. The coacting cam edges 172′ and 173′ are shaped and constructed as shown in Figs. 21–23 to achieve the cover-latching action to be described below. The cover is provided with defeatable and non-defeatable latch devices 134′ and 190, respectively, which coact with the latch plate 174′ which in turn is actuated by the plate 80‴ of the handle 20. The handle is externally locked by the locking slide 104′ which corresponds to the locking slide 104 previously described except slide 104′ is additionally provided with a projection 202 extending from the locking projection 128′ for rotating the plate 174′ into latching interengagement with latch device 190 (Fig. 21) when the handle is externally locked in the "off" position. The plate 80‴ is slotted as indicated at 204 for the reception of projection 202, the latter being slidable in said slot on the movement of the locking slide 104′. Thus the slide 104′ is slidable from the handle unlocked position as shown in Fig. 24 in solid lines to the handle locked position as shown in Fig. 25 in solid lines, the movement of the slide to the locked position being effective to lock the handle by the locking projection 128′ and to extend projection 202 to its "up" position, and when the handle is "off" the projection 202 rocks plate 174′ to latched interengagement with latch device 190. The plate 174′ is slotted as indicated at 206 to receive the slide projection 202 in the "reset" position of the handle.

With reference to Figs. 21 and 25 with the handle in the "off" position and unlocked, the plate 174′ will be in the broken line position and out of latching engagement with its companion latch device 190 whereby the cover is unlatched, the external locking of the handle being effective to rock plate 174′ to the solid line position into latched interengagement with latch device 190 to concomitantly non-defeatably lock the cover closed. In the "on" position of the handle, plate 174′ will be in defeatably latched engagement with latch device 134′ and when the handle is externally locked the cover will be defeatably locked. In the "reset" position of the handle, plate 174′ will be in the position shown in Fig. 23 in which such plate is out of engagement with the latch devices in both the handle locked and unlocked positions and thus the cover will be in an unlatched condition. The movement of the slide 104′ to handle-locking position will be effective to project the projection 202 into the slot 206 of plate 174′ so that the locking of the handle will not affect the position of plate 174′.

With reference to Figs. 26–32, there is shown another embodiment of enclosed circuit breaker 10″″ which is similar to the previous embodiment 10″′ except that the open cover position of the handle, which was the "reset" position of the breaker 10″′, is integrated with the "off" position of the handle in breaker 10″″ in the manner which will be described in detail below. The breaker 10″″ thus corresponds to the breaker 10″′ except in the respects to be detailed hereinafter. The handle actuating plate 80″″ is provided with a compound cam edge 172″ which coacts with the cam edge 173″ of the pivoted latch plate 174″ to move the latter to its various positions, the latch plate 174″ corresponding to the latch plate 174′ except that the former is not provided with a slot corresponding to slot 206. Thus the handle is not adapted for locking in the "reset" position and no provision is made for a "reset" locking slot in the plate 72. The handle is provided with a companion pair of slides 208 and 210 (Figs. 28–32) which are mounted to surface-to-surface relation in the handle for sliding movement in unison or independently. The slides 208 and 210 generally correspond to the slides previously described, the slide 208 having a locking projection 212 corresponding to the locking projection 128 previously described and the slide 210 having a projection 214 corresponding to the projection 202 previously described. With reference to Figs. 28 and 29, the plate 72 is provided with "on" and "off" slots 122 and 124, respectively, for the reception of the locking projection 212 of slide 208 for the locking of the handle in said positions. The projection 214 of slide 210 functions in the manner of projection 202 to rock the plate 174″ into latching engagement with latch device 190 in the "off" position of the handle. The slides 208 and 210 are provided with registering apertures 216 for the reception of the shank of a padlock with a maximum capacity of three padlocks and the aperture 216′ of slide 210 is elongated for a purpose which will be apparent from the description which follows.

In the unlocked "off" position of the circuit breaker handle, the cover will be unlatched as indicated by the broken line position of plate 174″ shown in Fig. 26 and both slides 208 and 210 will be in the down position. The handle may be locked with the cover unlatched by sliding the slide 208 only to the up position in which case the plate 174″ will be in the solid line position shown in Fig. 26. This will effect the extension of the locking projection 212 into its companion slot 124, and the slides will be in the relative positions shown in Fig. 32 in which the uppermost aperture 216 of slide 208 will be in registry with the companion elongated aperture 216′ of slide 210 so that the shank 218 of a single padlock may be extended through such registering apertures to lock the slides and handle in this condition. The handle may be locked in its "off" position with the cover non-defeatably locked by moving both slides to the up position in which case the projection 214 of slide 210 coacts with plate 174″ to rock the latter into latching engagement with latch device 190 as indicated by the broken line position of plate 174″ in Fig. 26. It will be understood that with the slides so positioned the apertures 216 thereof will register with the companion apertures 98 of the handle so that the latter may be locked with up to three padlocks.

In the "on" unlocked position of the handle (Fig. 27), the plate 174″ will be in latched engagement with the defeatable latch device 134′ as previously described in detail and the handle may be externally locked with a single padlock by moving the slide 208 only to its up position in the manner shown in Fig. 32 or the handle may be locked with multiple padlocks by moving both slides in unison to the up position. It will be apparent that the movement of slide 210 to the up position will have no effect on the position of plate 174″ with the handle in the "on" position.

Accordingly in enclosed circuit breaker 10″″ the handle may be externally locked with the cover locked in both the "on" and "off" handle positions and in the "off" position of the handle the latter may be externally locked with the cover unlatched to provide an open cover handle locked position.

While I have shown and described the preferred embodiments of my invention, it will be understood that various changes may be made in the present invention without departing from the underlying idea or principles of the invention within the scope of the appended claims.

I claim:

1. An enclosed circuit breaker having a front operated twist handle, an enclosure for said circuit breaker including a cover movable to open and closed positions and having an opening through which said handle projects, said opening being longer than the handle and being wide enough to enable the cover to be opened without interfering with the handle in different operated positions thereof, said circuit breaker filling said cover opening in the closed position of said cover, said handle being mounted on said circuit breaker and turnable to a plurality of different positions for correspondingly actuating the breaker mechanism, said circuit breaker having a latch part operable by said handle and said cover having a companion latch part engageable with said first mentioned latch part for latching the cover closed in a predetermined position of said handle.

2. An enclosed circuit breaker having a front operated twist handle, an enclosure for said circuit breaker including a cover movable to open and closed positions and having an opening through which said handle projects, said opening being longer than the handle and being wide enough to enable the cover to be opened without interfering with the handle in different operated positions thereof, said circuit breaker filling said cover opening in the closed position of said cover, said handle being mounted on said circuit breaker and turnable to a plurality of different positions for correspondingly actuating the breaker mechanism, said circuit breaker having a latch part operable by said handle and said cover having a companion latch part engageable with said first mentioned latch part for latching the cover closed in a predetermined position of said handle, and means for locking said handle in said predetermined position to concomitantly lock said cover closed.

3. An enclosed circuit controlling instrumentality having a front operated twist handle, an enclosure for said instrumentality including a cover movable to open and closed positions and having an opening providing accessibility to said handle, said instrumentality filling said opening in the closed position of said cover and said opening being longer than said handle and being so wide as to clear the handle in different operated positions thereof when the cover is being opened or closed, said handle being mounted on said instrumentality and turnable to a plurality of different positions for correspondingly actuating the mechanism of said instrumentality, the latter having latch means operable by said handle and said cover having companion latch means, said latch means and said companion latch means being interengageable in the closed position of said cover on the movement of said handle to a predetermined position.

4. An enclosed circuit controlling instrumentality having a front operated twist handle, an enclosure for said instrumentality including a cover movable to open and closed position and having an opening providing accessibility to said handle, said instrumentality filling said opening in the closed position of said cover and said opening being longer than said handle and being so wide as to clear the handle in different operated positions thereof when the cover is being opened or closed, said handle being mounted on said instrumentality and turnable to a plurality of different positions for correspondingly actuating the mechanism of said instrumentality, the latter having latch means operable by said handle and said cover having companion latch means, said latch means and said companion latch means being interengageable in the closed position of said cover on the movement of said handle to a predetermined position, and means for locking said handle in said predetermined position to concomitantly lock said cover closed.

5. An enclosed circuit breaker having a front operated twist handle, an enclosure for said circuit breaker including a cover movable to open and closed positions and having an opening through which said handle projects, said opening being longer than the handle and being wide enough to enable the cover to be opened without interfering with the handle in different operated positions thereof, said circuit breaker filling said cover opening in the closed position of said cover, said handle being mounted on said circuit breaker and turnable to a plurality of different positions for correspondingly actuating the breaker mechanism, said circuit breaker having a latch part operable by said handle and said cover having a companion latch part engageable with said first mentioned latch part for latching the cover closed in a predetermined position of said handle, and means having an externally accessible portion providing for the defeat of one of said latch parts to provide for the opening of said cover in said predetermined position of said handle.

6. An enclosed circuit breaker having a front operated twist handle, an enclosure for said circuit breaker including a cover movable to open and closed positions and having an opening through which said handle projects, said opening being longer than the handle and being wide enough to enable the cover to be opened without interfering with the handle in different operated positions thereof, said circuit breaker filling said cover opening in the closed position of said cover, said handle being mounted on said circuit breaker and turnable to a plurality of different positions for correspondingly actuating the breaker mechanism, said circuit breaker having a latch part operable by said handle and said cover having a companion latch part engageable with said first mentioned latch part for latching the cover closed in a predetermined position of said handle, said different handle positions including "on" and "off" positions and said predetermined position being said "on" position whereby said cover is latched closed in the "on" position of said handle.

7. An enclosed circuit breaker having a front operated twist handle, an enclosure for said circuit breaker including a cover movable to open and closed positions and having an opening through which said handle projects, said opening being longer than the handle and being wide enough to enable the cover to be opened without interfering with the handle in different operated positions thereof, said circuit breaker filling said cover opening in the closed position of said cover, said handle being mounted on said circuit breaker and turnable to "on" and "off" positions for correspondingly actuating the breaker mechanism, said circuit breaker having latch means operable by said handle and said cover having companion latch means, said latch means and companion latch means being interengageable in the closed position of said cover on the movement of said handle to said "on" position, means providing for the defeat of said interengaged latch means to provide for the opening of said cover in said "on" position of said handle, and means for locking said handle in said "on" position to concomitantly defeatably lock said cover closed.

8. An enclosed circuit breaker having a front operated twist handle, an enclosure for said circuit breaker including a cover movable to open and closed positions and having an opening through which said handle projects, said opening being longer than the handle and being wide enough to enable the cover to be opened without interfering with the handle in different operated positions thereof, said circuit breaker filling said cover opening in the closed position of said cover, said handle being mounted on said circuit breaker and turnable to a plurality of different positions for correspondingly actuating the breaker mechanism, the latter having a pivotally movable lever operatively engaged with a slidable plate, said handle having an actuating plate operatively engaged with said slidable plate to transmit motion on the turnable movement of said handle to said lever to correspondingly actuate said breaker mechanism, said actuating plate having a latch part and said cover having a companion latch part, said latch parts being interengageable in the closed position of said cover on the movement of said handle to a predetermined position.

9. An enclosed circuit breaker having a front operated twist handle, an enclosure for said circuit breaker including a cover movable to open and closed positions and having an opening through which said handle projects, said opening being longer than the handle and being wide enough to enable the cover to be opened without interfering with the handle in different operated positions thereof, said circuit breaker filling said cover opening in the closed position of said cover, said handle being mounted on said circuit breaker and turnable to a plurality of different positions for correspondingly actuating the breaker mechanism, means for transmitting motion from said handle to said breaker mechanism, a latch part operable by said handle and said cover having a companion latch part, said latch parts being interengageable in the closed position of said cover on the movement of said handle to a predetermined position.

10. An enclosed circuit breaker having a front operated twist handle, an enclosure for said circuit breaker including a cover movable to open and closed positions and having an opening through which said handle projects, said opening being longer than the handle and being wide enough to enable the cover to be opened without interfering with the handle in different operated positions thereof, said circuit breaker filling said cover opening in the closed position of said cover, said handle being mounted on said circuit breaker and turnable to "on" and "off" positions for correspondingly actuating the breaker mechanism, said circuit breaker having latch means operable by said handle and said cover having companion latch means, said latch means and companion latch means being interengageable in the closed position of said cover on the movement of said handle to said "on" position, means for transmitting motion from said handle to said breaker mechanism including a companion pair of operatively interengaged plates, one of which is slidable in a plane substantially parallel to the plane of said cover in the closed position thereof with the other one being rotatable in said plane, one of said plates having said latch means, means providing for the defeat of said interengaged latch means to provide for the opening of said cover in said "on" position of said handle, and means for locking said handle in said "on" position to concomitantly defeatably lock said cover closed.

11. An enclosed circuit breaker having a front operated twist handle, an enclosure for said breaker including a cover movable to open and closed positions and having an opening through which said handle projects, said breaker filling said cover opening in the closed position of said cover and said opening being longer than said handle and being so wide as to clear the handle in different operated positions thereof when the cover is being opened or closed, said handle being mounted on said breaker and turnable to "on" and "off" positions for correspondingly actuating the breaker mechanism, said breaker having latch means operable by said handle and said cover having companion latch means, said latch means and companion latch means being interengageable in the closed position of said cover in the "on" and "off" positions of said handle, and means for locking said handle in either of said positions to concomitantly lock said cover closed.

12. An enclosed circuit breaker having a front operated twist handle, an enclosure for said breaker including a cover movable to open and closed positions and having an opening through which said handle projects, said breaker filling said cover opening in the closed position of said cover and said opening being longer than said handle and being so wide as to clear the handle in different operated positions thereof when the cover is being opened or closed, said handle being mounted on said breaker and turnable to "on" and "off" positions for correspondingly actuating the breaker mechanism, said breaker having latch means operable by said handle and said cover having companion latch means, said latch means and companion latch means being interengageable in the closed position of said cover in the "on" and "off" positions of said handle, said handle being movable to another position in which said latch means and companion latch means are out of engagement to permit the cover to be opened, and means for locking said handle in either said "on" or "off" position to concomitantly lock said cover closed.

13. An enclosed circuit breaker having a front operated twist handle, an enclosure for said breaker including a cover movable to open and closed positions and having an opening through which said handle projects, said breaker filling said cover opening in the closed position of said cover and said opening being longer than said handle and being so wide as to clear the handle in different operated positions thereof when the cover is being opened or closed, said handle being mounted on said breaker and turnable to "on" and "off" positions for correspondingly actuating the breaker mechanism, said breaker having latch means operable by said handle and said cover having companion latch means, said latch means and companion latch means being interengageable in the closed position of said cover in the "on" and "off" positions of said handle, and means for locking said handle in either of said positions to concomitantly lock said cover closed, said latch means and companion latch means being defeatably engaged in said "on" position of said handle and being non-defeatably engaged in the "off" position of said handle, whereby in said latter position the locking of said handle is effective to non-defeatably lock said cover closed.

14. An enclosed circuit breaker having a front operated twist handle, an enclosure for said breaker including a cover movable to open and closed positions and having an opening through which said handle projects, said breaker filling said cover opening in the closed position of said cover and said opening being longer than said handle and being so wide as to clear the handle in different operated positions thereof when the cover is being opened or closed, said handle being mounted on said breaker and turnable to "on" and "off" positions for correspondingly actuating the breaker mechanism, said breaker having latch means operable by said handle and said cover having companion latch means, said latch means and companion latch means being interengageable in the closed position of said cover in the "on" and "off" positions of said handle, said handle being movable to another position in which said latch means and companion latch means are out of engagement to permit the cover to be opened, and means for locking said handle in either said "on" or "off" position to concomitantly lock said cover closed, said latch means and companion latch means being defeatably engaged in said "on" position of said handle and being non-defeatably engaged in the "off" position of said handle, whereby in said latter position the locking of said handle is effective to non-defeatably lock said cover closed.

15. An enclosed circuit breaker having a front operated twist handle, an enclosure for said breaker including a cover movable to open and closed positions and having an opening through which said handle projects, said breaker filling said cover opening in the closed position of said cover and said opening being longer than said handle and being so wide as to clear the handle in different operated positions thereof when the cover is being opened or closed, said handle being mounted on said breaker and turnable to "on" and "off" positions for correspondingly actuating the breaker mechanism, means for transmitting motion from said handle to said breaker mechanism, a latch part operable by said mechanism and said cover having companion defeatable and non-defeatable latch parts, said latch part being engageable with said defeatable and non-defeatable latch parts in the "on" and "off" positions, respectively, of said handle in the closed position of said cover, means for locking said handle in either of said positions to concomitantly lock said cover closed, and said handle being movable to another position in which said latch parts are out of engagement to permit the cover to be opened.

16. An enclosed circuit breaker having a front operated twist handle, an enclosure for said breaker including a cover movable to open and closed positions and having an opening through which said handle projects, said breaker filling said cover opening in the closed position of said cover and said opening being longer than said handle and being so wide as to clear the handle in different operated positions thereof when the cover is being opened or closed, said handle being mounted on said breaker and turnable to "on" and "off" positions for correspondingly actuating the breaker mechanism, said handle being lockable in either of said positions and having a locking member mounted thereon for movement from handle-releasing position to handle-locking position, said breaker having latch means operable by said handle and said cover having companion latch means, said latch means and companion latch means being interengageable in the closed position of said cover in the "on" position of said handle and in the "off" position thereof on the movement of said locking member to handle-locking position, said latch means and companion latch means being out of engagement in the "off" position of said handle with said locking member in handle-releasing position, the locking of said handle in either said "on" or "off" position being thereby effective to concomitantly lock said cover closed.

17. An enclosed circuit breaker having a front operated twist handle, an enclosure for said breaker including a cover movable to open and closed positions and having an opening through which said handle projects, said breaker filling said cover opening in the closed position of said cover and said opening being longer than said handle and being so wide as to clear the handle in different operated positions thereof when the cover is being opened or closed, said handle being mounted on said breaker and turnable to 'on" and "off" positions for correspondingly actuating the breaker mechanism, said handle being lockable in either of said positions and having a locking member mounted thereon for movement from handle-releasing position to handle-locking position, said breaker having latch means operable by said handle and said cover having companion latch means, said latch means and companion latch means being interengageable in the closed position of said cover in the "on" position of said handle and in the "off" position thereof on the movement of said locking member to handle-locking position, said latch means and companion latch means being out of engagement in the "off" position of said handle with said locking member in handle-releasing position, the locking of said handle in either said "on" or "off" position being thereby effective to concomitantly lock said cover closed, said handle being movable to another position in which said latch means and companion latch means are out of engagement to permit the cover to be opened with said locking member in either handle-releasing or handle-locking position.

18. An enclosed circuit breaker having a front operated twist handle, an enclosure for said breaker including a cover movable to open and closed positions and having an opening through which said handle projects, said breaker filling said cover opening in the closed position of said cover and said opening being longer than said handle and being so wide as to clear the handle in different operated positions thereof when the cover is being opened or closed, said handle being mounted on said breaker and turnable to "on" and "off" positions for correspondingly actuating the breaker mechanism, said handle being lockable in either of said positions and having a pair of members movable in unison and independently, one of said members being a locking member movable from handle-releasing position to handle-locking position, and the other member being an actuating member movable from an unlatched position to a latched position, said breaker having latch means operable by said handle and said cover having companion latch means, said latch means and companion latch means being interengageable in the closed position of said cover in the "on" position of said handle and in the "off" position thereof on the movement of said actuating member to latched position, said latch means and companion latch means being out of engagement in the "off" position of said handle with said actuating member in said unlatched position, the locking of said handle in said "on" position and in said "off" position with said locking and actuating members in handle-locking and latched positions, respectively, being effective to concomitantly lock said cover closed.

19. An enclosed circuit breaker having a front operated twist handle, an enclosure for said breaker including a cover movable to open and closed positions and having an opening through which said handle projects, said breaker filling said cover opening in the closed position of said cover and said opening being longer than said handle and being so wide as to clear the handle in different operated positions thereof when the cover is being opened or closed, said handle being mounted on said breaker and turnable to "on" and "off" positions for correspondingly actuating the breaker mechanism, said handle being lockable in either of said positions and having a pair of members movable in unison and independently, one of said members being a locking member movable from handle-releasing position to handle-locking position, and the other member being an actuating member movable from an unlatched position to a latched position, said breaker having latch means operable by said handle and said cover having companion latch means, said latch means and companion latch means being interengageable in the closed position of said cover in the "on" position of said handle and in the "off" position thereof on the movement of said actuating member to latched position, said latch means and companion latch means being out of engagement in the "off" position of said handle with said actuating member in said unlatched position, the locking of said handle in said "on" position and in said "off" position with said locking and actuating members in handle-locking and latched positions, respectively, being effective to concomitantly lock said cover closed, and means pro-viding for the locking of said locking member in handle-locking position and said actuating member in unlatched position in the "off" position of said handle for locking the latter in said position while permitting the cover to be opened.

20. An enclosed circuit breaker having a front operated twist handle, an enclosure for said breaker including a cover movable to open and closed positions and having an opening through which said handle projects, said breaker filling said cover opening in the closed position of said cover and said opening being longer than said handle and being so wide as to clear the handle in different operated positions thereof when the cover is being opened or closed, said handle being mounted on said breaker and turnable to "on" and "off" positions for correspondingly actuating the breaker mechanism, said handle being lockable in either of said positions and having a pair of members movable in unison and independently, one of said members being a locking member movable from handle-releasing position to handle-locking position, and the other member being an actuating member movable from an unlatched position to a latched position, said breaker having latch means operable by said handle and said cover having companion latch means, said latch means and companion latch means being interengageable in the closed position of said cover in the "on" position of said handle and in the "off" position thereof on the movement of said actuating member to latched position, said latch means and companion latch means being out of engagement in the "off" position of said handle with said actuating member in said unlatched position, the locking of said handle in said "on" position and in said "off" position with said locking and actuating members in handle-locking and latched positions, respectively, being effective to concomitantly lock said cover closed, said latch means and companion latch means being defeatably engaged in said "on" position of said handle and being non-defeatably engaged in the "off" position of said handle with said actuating member in latched position.

21. A front operated enclosed switching apparatus including a front cover having an opening and being movable between closed and opened positions, electrical switching apparatus having a front portion received in the cover opening and filling the cover opening when the cover is in its closed position, an operating handle carried by the switching apparatus and projecting through the cover opening to a free operating position in front of the cover, said cover opening being longer than said handle and being wide enough to clear the handle in the different operated positions thereof during opening and closing of the cover, and cooperating devices carried by the switching apparatus and by the cover adjacent the opening therein for releasably locking the cover in its closed position, said devices being operable by said handle in dependence upon its various positions assumed in the operation of the switching apparatus to latch or release the cover for opening.

22. A front operated enclosed switching apparatus including a front cover having an opening and being movable between closed and opened positions, electrical switching apparatus having a front portion received in the cover opening and filling the cover opening when the cover is in its closed position, an operating handle carried by the switching apparatus and projecting through the cover opening to a free operating position in front of the cover, said cover opening being longer than said handle and being wide enough to clear the handle in the different operated positions thereof during opening and closing of the cover, and cooperating devices carried by the switching apparatus and by the cover adjacent the opening therein for releasably locking the cover in its closed position, said devices being operable by said handle in dependence upon its various positions assumed in the operation of the switching apparatus to latch or release the cover for opening, said handle having means for locking the handle in selected positions and thereby locking the cover closed.

23. A current interrupter of the type including a housing having a molded base of insulation and a cover united thereto, cooperable contacts and operating mechanism therefor mounted in said base and contained in said housing, externally accessible terminals connected to said contacts, respectively, said current interrupter including a front-operated twist-lever handle mounted on said cover and having a connection to said operating mechanism internal of said housing, and means integrally forming part of the current interrupter and selectively positionable to leave the handle free for operation or to act between said cover and said handle for locking said handle in either its "on" or its "off" position.

24. A current interrupter of the type including a housing having a molded base of insulation and a cover united thereto, cooperable contacts and operating mechanism therefor mounted in said base and contained in said housing, externally accessible terminals connected to said contacts, respectively, said current interrupter including a front-operated twist-lever handle mounted on said cover and having a connection to said operating mechanism internal of said housing, and interlock means carried by said cover and effective to cooperate with means forming part of an enclosure in which the current interrupter may be mounted for locking the enclosure cover to the enclosure in dependence upon the position of the handle.

25. A current interrupter of the type including a housing having a molded base of insulation and a cover united thereto, cooperable contacts and operating mechanism therefor mounted in said base and contained in said housing externally accessible terminals connected to said contacts, respectively, said current interrupter including a front-operated twist-lever handle mounted on said cover and having a connection to said operating mechanism internal of said housing, means forming an integral part of said current interrupter and acting between the cover and the handle to lock the handle in either its "off" position or its "on" position, and interlock means carried by the cover and effective to coact with means forming part of an enclosure in which the current interrupter may be mounted for locking the enclosure cover closed in dependence on the position of the handle and the locked or released condition of the handle locking means.

26. In combination, a circuit interrupter of the molded-case type and a metal enclosure therefor, a front-operated twist-lever handle mounted on and forming a unitary part of said circuit interrupter, said metal enclosure including a cover having a cut-out to clear the handle in its various operated positions during opening of the cover and the front of said circuit interrupter closing off said cut-out in the closed condition of the cover, and interlock means carried in part by said enclosure and in part by said circuit interrupter for locking said cover closed selectively in dependence on the position of the handle.

27. In combination, a circuit interrupter of the molded-case type and a metal enclosure therefor, a front-operated twist-lever handle mounted on and forming a unitary part of said circuit interrupter, said metal enclosure including a cover having a cut-out to clear the handle in its various operated positions during opening of the cover and the front of said circuit interrupter closing off said cut-out in the closed condition of the cover, and interlock means carried in part by said enclosure and in part by said circuit interrupter for locking said cover closed selectively in dependence on the position of the handle, and locking means forming a unitary part of said circuit interrupter and acting between said handle and a fixed part of the circuit interrupter for locking the handle in either its "on" or its "off" position.

28. In combination, a circuit interrupter of the molded-case type and a metal enclosure therefor, a front-operated twist-lever handle mounted on and forming a unitary part of said circuit interrupter, said metal enclosure including a cover having a cut-out to clear the handle in its various operated positions during opening of the cover and the front of said circuit interrupter closing off said cut-out in the closed condition of the cover, and interlock means carried in part by said enclosure and in part by said circuit interrupter for locking said cover closed selectively in dependence on the positon of the handle, and locking means forming a unitary part of said circuit interrupter and selectively positionable to leave the handle free for operation or to act between said handle and a fixed part of the circuit interrupter for locking the handle in either its "on" or its "off" position, said handle locking means having means coacting with the part of the cover interlock means carried by the circuit interrupter for rendering the interlock effective in at least one selected position of the handle.

29. In combination, a circuit interrupter of the molded-case type and a metal enclosure therefor, a front-operated twist-lever handle mounted on and forming a unitary part of said circuit interrupter, said metal enclosure including a cover having a cut-out to clear the handle in its various operated positions during opening of the cover and the front of said circuit interrupter closing off said cut-out in the closed condition of the cover, and interlock means carried in part by said enclosure and in part by said circuit interrupter and including cover latch means and cover-restraining latch means cooperable with the cover latch means to hold the cover closed, said interlock means having a mechanical coupling to said handle arranged for selective control of one of said latch means in dependence on the position of said handle for latching the cover closed or releasing said cover selectively.

30. In combination, a circuit interrupter of the molded-case type and a metal enclosure therefor, a front-operated actuating lever mounted on and forming a unitary part of said circuit interrupter, said metal enclosure including a cover having a cut-out to clear the handle in its various operated positions during opening of the cover and the front of said circuit interrupter closing off said cut-out in the closed position of the cover, and interlock means carried in part by said enclosure and in part by said circuit interrupter and including mechanical co-ordinating means coupled to said handle to be selectively rendered effective or ineffective in dependence on the position of the handle for selectively locking said cover closed.

References Cited in the file of this patent

UNITED STATES PATENTS

| 2,163,230 | Rowe | June 20, 1939 |
| 2,260,073 | Ellis | Oct. 21, 1941 |
| 2,263,760 | Currie | Nov. 25, 1941 |
| 2,512,505 | Rowe | June 20, 1950 |
| 2,695,934 | Wills | Nov. 30, 1954 |